Jan. 9, 1962

C. H. JOHNSON 3,015,976

CENTER DRIVE MACHINE TOOL

Filed Feb. 27, 1957

INVENTOR.
Charles H. Johnson

Jan. 9, 1962   C. H. JOHNSON   3,015,976
CENTER DRIVE MACHINE TOOL
Filed Feb. 27, 1957   8 Sheets-Sheet 5

INVENTOR.
Charles H. Johnson
BY
ATTORNEYS.

Jan. 9, 1962     C. H. JOHNSON     3,015,976
CENTER DRIVE MACHINE TOOL
Filed Feb. 27, 1957     8 Sheets-Sheet 7

INVENTOR.
Charles H. Johnson
BY
ATTORNEYS.

Jan. 9, 1962 C. H. JOHNSON 3,015,976
CENTER DRIVE MACHINE TOOL
Filed Feb. 27, 1957 8 Sheets-Sheet 8

INVENTOR.
Charles H. Johnson
BY
*Andrus & Sceales*
ATTORNEYS.

United States Patent Office 3,015,976
Patented Jan. 9, 1962

3,015,976
CENTER DRIVE MACHINE TOOL
Charles H. Johnson, Madison, Wis., assignor to Gisholt Machine Company, Madison, Wis., a corporation of Wisconsin
Filed Feb. 27, 1957, Ser. No. 642,753
4 Claims. (Cl. 82—14)

This invention relates to a center drive machine tool, and more particularly to a center drive lathe or the like for machining workpieces such as jet engine compressor discs.

Such workpieces vary considerably in diameter and contour, and they often have portions of very thin section which heretofore has produced numerous problems as to machining accuracy and tolerance control. It has been found extremely difficult to produce workpieces having a section as thin as .115 inch by machining only one side of the workpiece at a time. In addition, prior mechanism to provide a plurality of cutting passes on the workpieces has proved inefficient and inadequate. Furthermore, difficulties have been encountered due to the tendency of the workpiece to vibrate or distort during machining, especially in the areas of thin section, and it is believed that no completely adequate means has been found heretofore to prevent such difficulties.

The machine tool of this invention substantially overcomes all of the above-mentioned problems, and provides for machining of both faces of a workpiece simultaneously. Tracer mechanism is provided which is quickly adjustable to produce a plurality of different tool movements for different cutting passes. In addition, the unit includes improved means for supporting the workpiece in a manner to prevent vibratory movement or distortion thereof during the facing cuts.

The accompanying drawings illustrate the best mode contemplated by the inventor for carrying out the invention.

Figure 1:
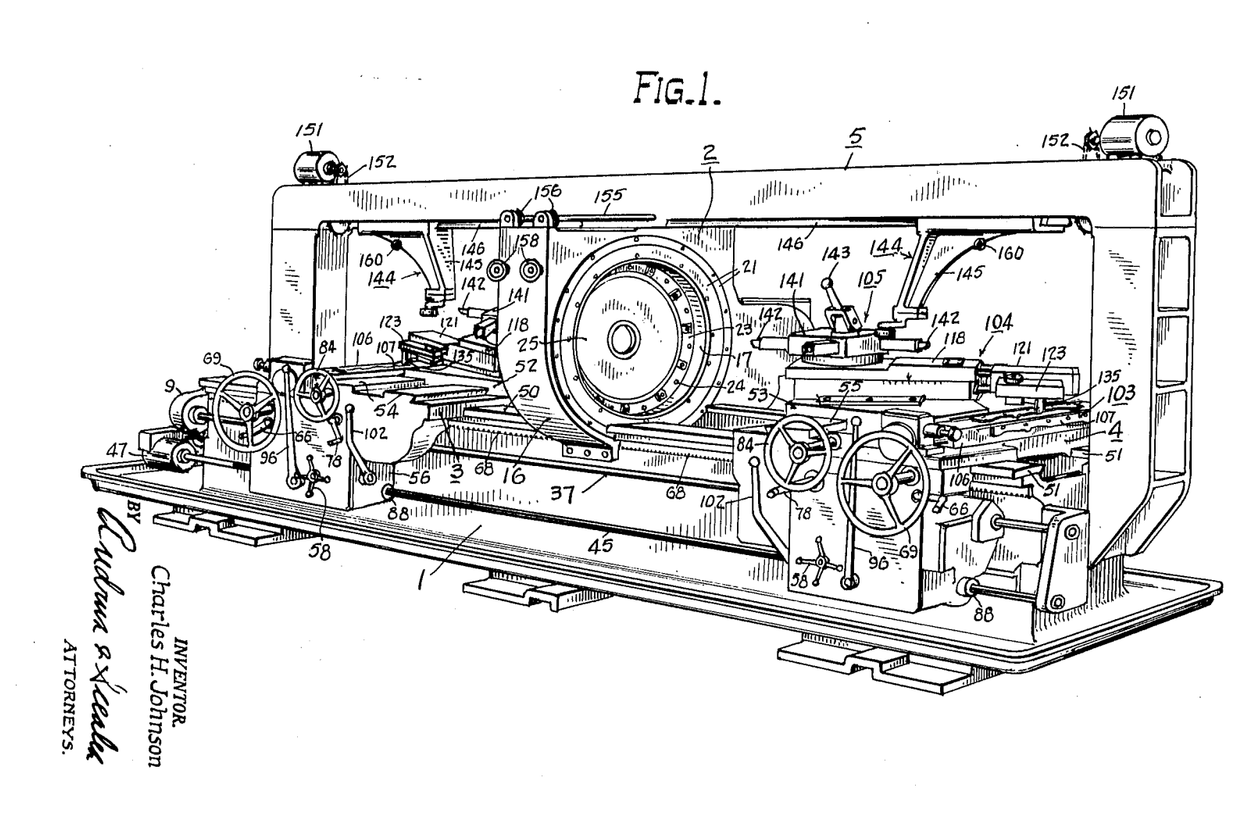
FIGURE 1 is a perspective view of a machine tool constructed in accordance with the invention.

As shown in FIG. 1 of the drawings, the machine tool comprises, generally, a rigidly supported bed 1, a transversely extending headstock unit 2 disposed centrally of the bed and supported thereby, a left and a right carriage, 3 and 4 respectively, disposed for longitudinal movement on the corresponding left and right halves of the bed, and a longitudinally extending stabilizer support 5 disposed above bed 1 and securing the upper portion of headstock unit 2. Support 5 comprises an overhead beam or bridge supported by suitable vertical columns at each end of the bed.

Figure 2:
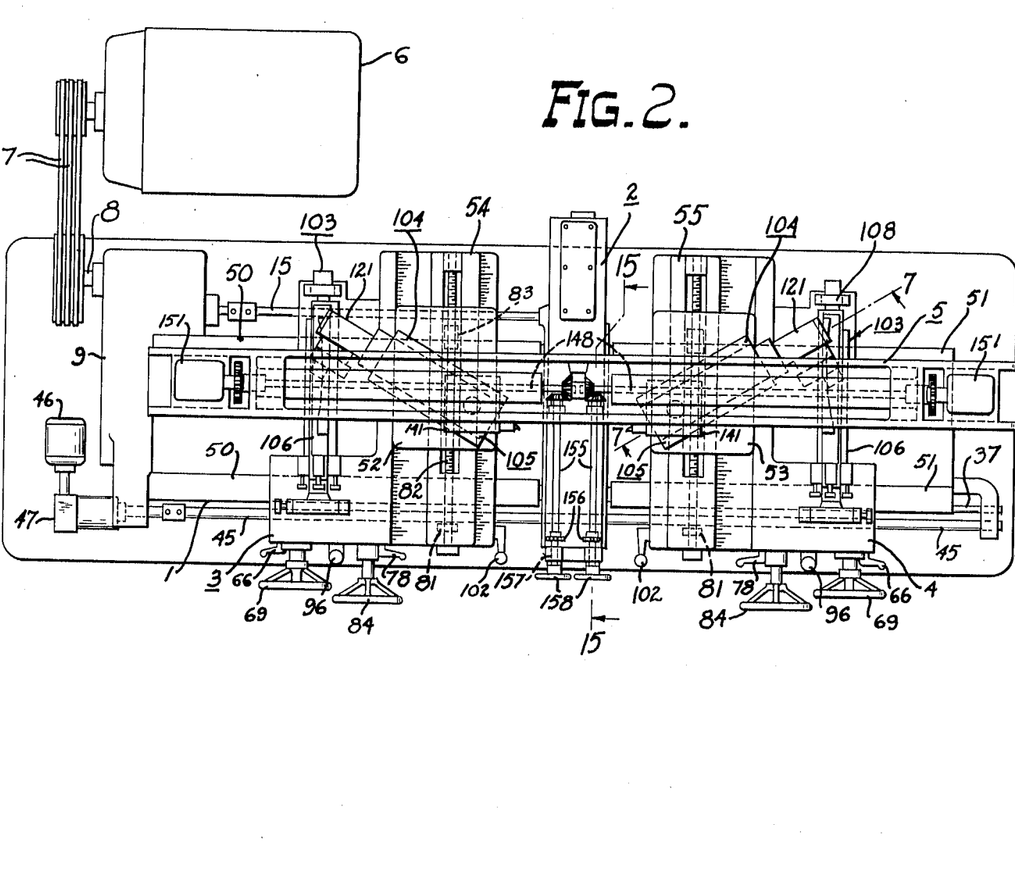
FIG. 2 is a top plan view of the machine.
Figure 3:
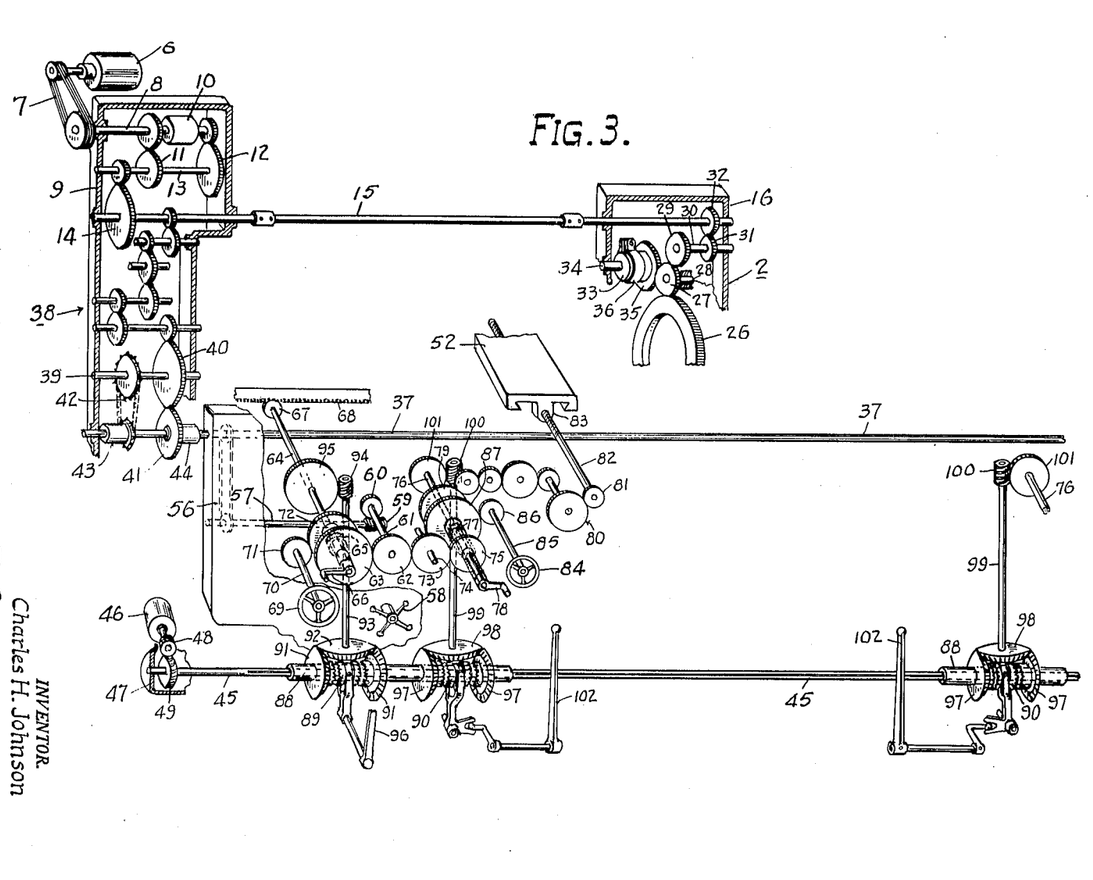
FIG. 3 is a diagrammatic view of the various drive mechanisms of the machine.

The machine is powered by a variable speed reversible motor 6 (FIGS. 2 and 3) mounted adjacent bed 1 and adapted to rotate headstock unit 2 in either direction. Motor 6 is operatively connected through suitable belts 7 to a longitudinally extending drive shaft 8 mounted for rotation in a gear case 9 secured to the left end portion of bed 1. Drive shaft 8 is selectively connected through suitable clutching mechanism 10 to either gear 11 or 12 mounted on an intermediate shaft 13 rotatable in case 9. The resultant speed of rotation of shaft 13 will depend on whether shaft 8 is clutched to shaft 13 through gear 11 or through gear 12. Shaft 13 is connected through suitable gearing 14 to the headstock drive shaft 15, the outer end of which is suitably mounted for rotation in case 9 and which extends inwardly therefrom behind bed 1 to headstock unit 2.

Figures 12, 16:
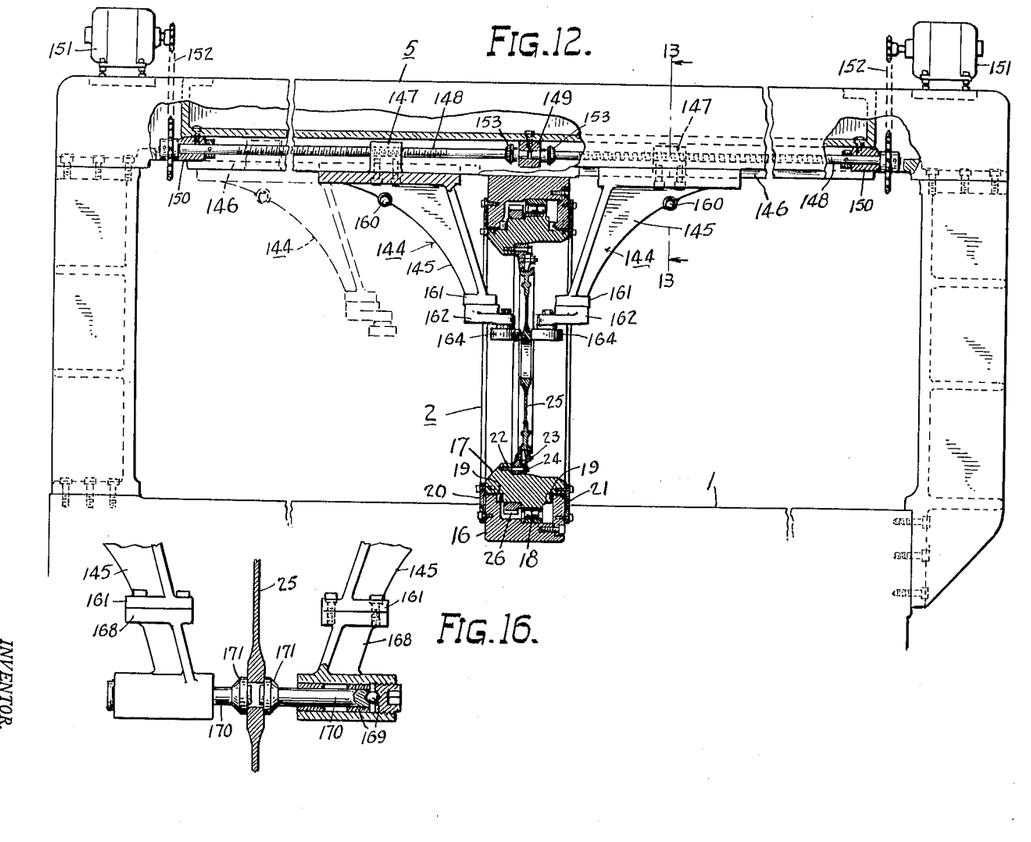
FIG. 12 is a front elevation of the machine with parts broken away and showing the steady-rest mechanism and with the spindle mount shown in vertical section.
FIG. 16 is a fragmentary front elevation of a modified form of steady-rest roll and with the workpiece in section.

Unit 2 comprises a generally circular vertically extending housing 16, the lower portion of which is received within a suitable transverse opening disposed centrally in bed 1 and which is rigidly secured to the bed in any suitable manner. A spindle 17 of generally ring-like configuration is mounted for rotation concentrically within housing 16 by means of a suitable roller bearing 18 and thrust bearings 19 (FIG. 12). Spindle 17 is of approximately the same width as housing 16 and the exposed faces of the joint therebetween are protected by left and right split sealing rings, 20 and 21 respectively, which are mounted on the corresponding faces of the headstock unit.

Figures 7, 8:
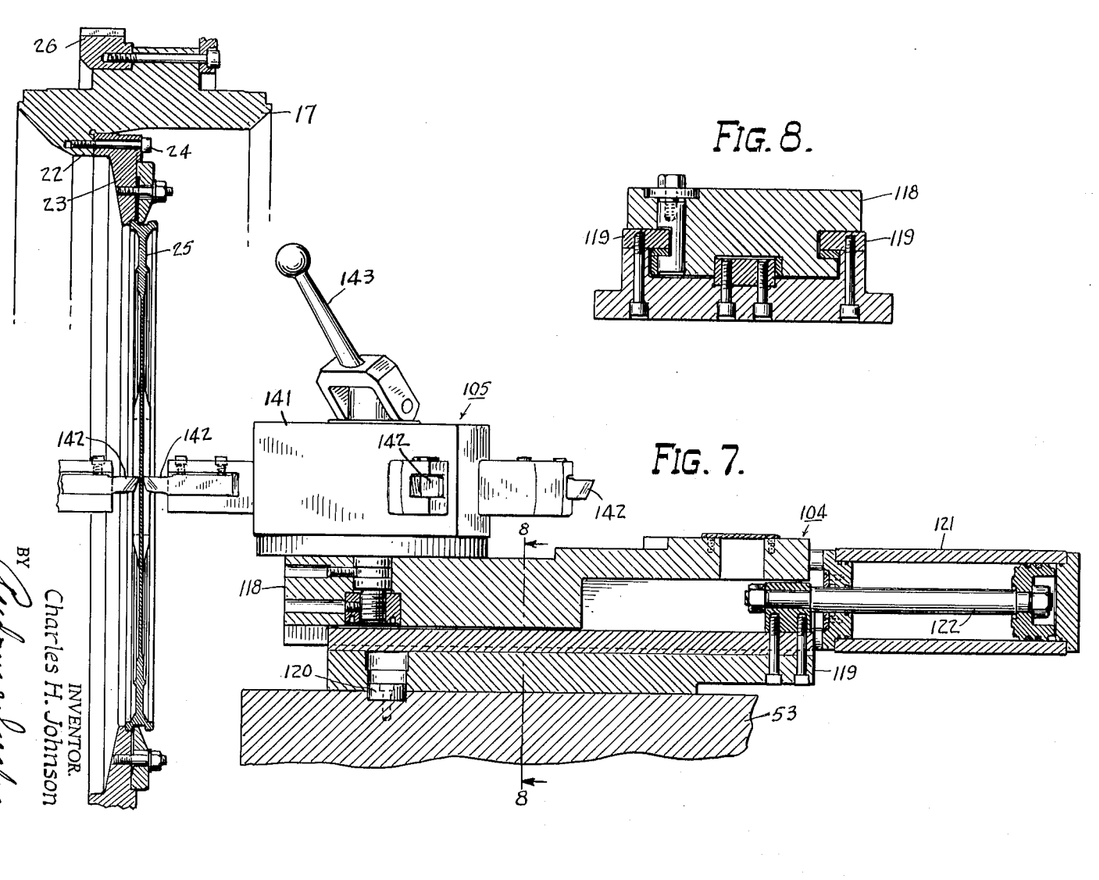
FIG. 7 is a vertical section of one of the tracer slides taken on line 7—7 of FIG. 2 and showing the tool turret in elevation.
FIG. 8 is a transverse section of the tracer slide taken on line 8—8 of FIG. 7.

The inner circumferential surface of spindle 17 is provided with a radially inwardly extending shoulder 22 (FIGS. 7 and 12) which is adapted to receive a work holding member or chuck unit 23 mounted on the radial face thereof by suitable bolts 24. Chuck unit 23 may be of any suitable type for securely holding a disc-like workpiece 25 in a vertical position for machining. Shoulder 22 is shown in the drawings as being disposed adjacent the left side of spindle 17, but the shoulder could be located in any other suitable position depending on the requirements dictated by workpiece thickness and the like.

A circumferential spindle drive gear 26 is fixedly mounted on the outer circumferential surface of spindle 17 within housing 16. Ring-gear 26 meshes with a suitable gear 27 (FIGS. 3 and 13) keyed on a longitudinally extending shaft 28 with the latter being mounted for rotation in a rearward extension of housing 16. Gear 27 also meshes with a similar gear 29 keyed on a similar shaft 30 in housing 16. A second gear 31 keyed on shaft 30 meshes with a gear 32 keyed on the inner end portion of headstock drive shaft 15 which extends within housing 16. The above recited combination of gears and shafts provides a gear train between drive shaft 15 and spindle 17.

Figures 13, 14, 15:
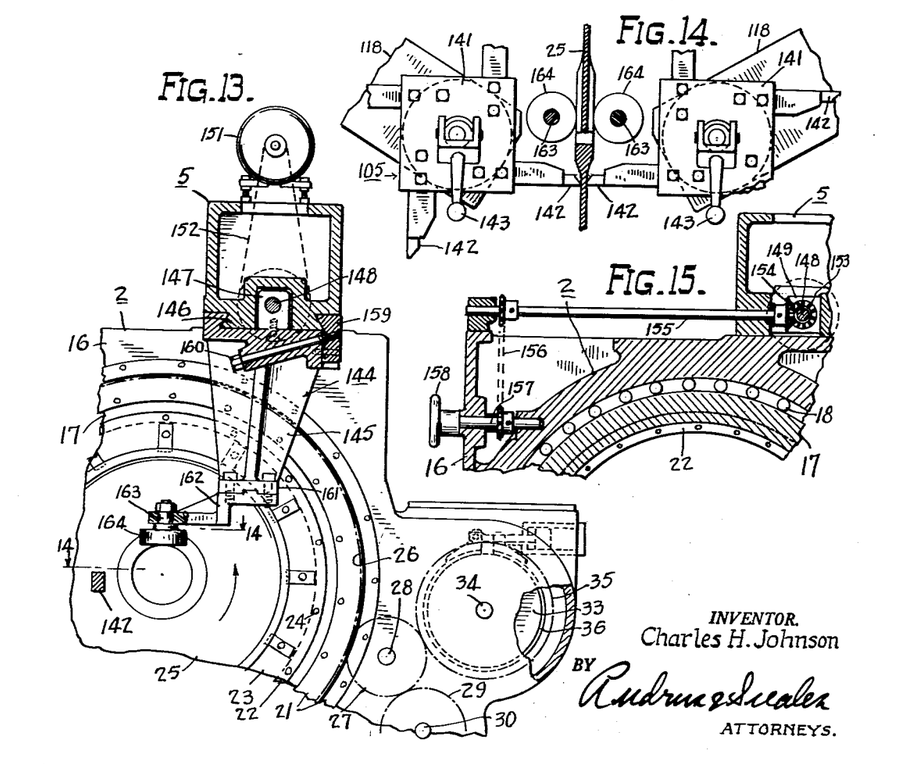
FIG. 13 is a vertical section taken on line 13—13 of FIG. 12 and showing the spindle drive and steady-rest clamp.
FIG. 14 is a horizontal section taken on line 14—14 of FIG. 13 and showing the steady-rest and opposing tools in engagement with the workpiece.
FIG. 15 is a fragmentary vertical section taken on line 15—15 of FIG. 2 and showing the manual drive for one of the steady-rest units.

Desired braking of the spindle is provided by a brake drum 33 (FIG. 3) mounted on a longitudinally extending rotatable shaft 34 disposed within housing 16. A suitable gear 35 is secured to drum 33 and meshes with gear 27 to link the brake with the spindle. A brake band 36 is disposed concentrically of drum 33 and may be loosened or tightened on the drum by any suitable means, such as a hydraulic cylinder (FIG. 13).

Motor 6 is also adapted to drive a longitudinally extending feed rod 37 (FIG. 3) mounted just beneath the upper surface of bed 1 and forwardly thereof. The connection between motor 6 and feed rod 37 is provided by a gear train, indicated generally at 38, which extends between headstock drive shaft 15 and the left end portion of rod 37 disposed in gear case 9. Gear train 38 permits a suitable gear reduction between the motor and rod.

Figure 3A:
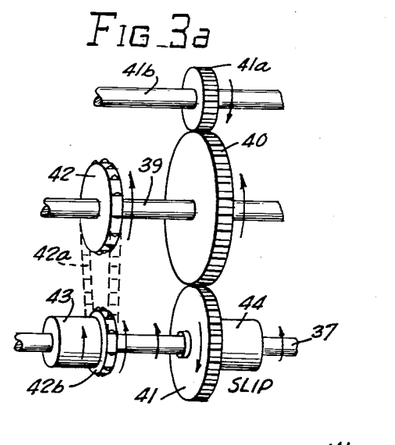
FIG. 3a is a perspective view of the unidirectional slip clutch mechanism showing the drive of the feed shaft when the spindle drive is rotating in one direction.
Figure 3B:
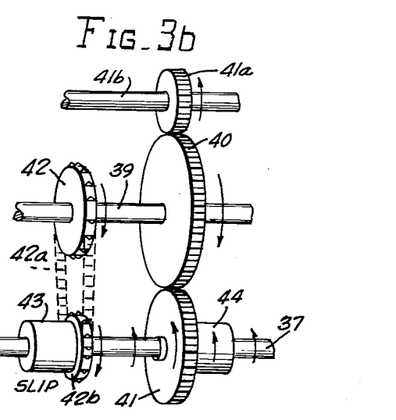
FIG. 3b is a view similar to FIG. 3a but when the spindle drive is rotating in the opposite direction.

A shaft 39 is disposed at the forward end of gear train 38 and has a gear 40 fixedly mounted thereon for direct connection between the gear train and a gear 41 which is mounted on bearings on rod 37 for rotation relative thereto. See FIGS. 3a and 3b. For this purpose, gear 40 meshes with a gear 41a on a shaft 41b in the gear train. A sprocket 42 is also fixedly mounted on shaft 39, and connects through a chain 42a to a second sprocket 42b, the latter being mounted on bearings on rod 37 for rotation relative thereto. A unidirectional overriding clutch member 43 of any suitable well-known type is mounted on rod 37 adjacent sprocket 42b and is adapted to rotate rod 37 from sprocket 42b and in a given direction only when shaft 41b is rotating in one direction. A second unidirectional overriding clutch member of any suitable well-known type is mounted on rod 37 adjacent gear 41 and is adapted to rotate rod 37 from gear 41 and in the same direction as before only when shaft 41b is rotating in the opposite direction as before. Thus, the rotation of feed rod 37 can be automatically maintained in the same direction, even if the direction of spindle rotation is reversed by motor 6.

A traverse drive shaft 45 is also rotatably mounted forwardly of bed 1 and is spaced beneath feed rod 37 and extends parallel thereto. Shaft 45 is driven by a separate motor 46 mounted on the left end of bed 1 adjacent gear case 9. The output shaft of motor 46 extends forwardly within a housing 47, and a worm pinion 48 thereon meshes with a suitable worm gear 49 disposed adjacent the end of traverse drive shaft 45.

Motors 6 and 46 may be controlled by any suitable switch means, not shown.

Left carriage 3 and right carriage 4 are supported by bed 1 on the corresponding side of headstock unit 2, and are adapted for longitudinal movement on suitable ways 50 and 51. Cross slides 52 and 53 are mounted on the corresponding left and right carriages and are adapted for transverse movement on suitable ways 54 and 55. Since both carriages 3 and 4 and their associated elements are substantially identical except for a reversal of parts, reference will be made to only one carriage, it being understood that the description applies equally well to both carriages. In the description, the term inwardly will indicate toward headstock unit 2 and the term outwardly will indicate away from the headstock unit.

The primary drive for operational movement of carriages 3 and 4 is provided by rod 37, thereby correlating movement of the carriages and cross slides with the spindle speed. As shown schematically in FIG. 3, a transmission box 56 is disposed between rod 37 and a longitudinally extending shaft 57 disposed behind the carriage apron and forwardly and downwardly from rod 37. Box 56 has a plurality of suitable gears and clutches therein, not shown, which are adapted to provide forward and reverse rotation and speed shifts of shaft 57 relative to rod 37. Actuation of the gears and clutches to produce the desired speed and direction changes is accomplished by a rotatable handwheel 58 mounted on the carriage apron and connected by suitable mechanism to the transmission mechanism in box 56.

A feed worm 59 is keyed to shaft 57 inwardly of box 56, and a worm wheel 60 keyed on a transversely extending shaft 61 meshes with the worm 59. A pinion 62 is keyed adjacent the forward end of shaft 61 and meshes with a gear 63 which is loosely mounted on the forward portion of a transversely extending longitudinal carriage feed shaft 64. Shaft 64 is mounted outwardly of shaft 61. A clutch 65 is mounted on shaft 64 and is actuated by suitable mechanism connected to a longitudinal feed lever 66 to connect gear 63 to shaft 64 to rotatably actuate shaft 64 from shaft 57. A pinion 67 is keyed to the rear end of shaft 64 and meshes with a longitudinally extending rack 68 on bed 1. Rotation of shaft 64 will thus move the carriage longitudinally on the respective way.

Manual control of the longitudinal movement of the carriage is accomplished by a handwheel 69 mounted on the carriage apron. Handwheel 69 is directly connected to shaft 64 through a handwheel shaft 70, a pinion 71 keyed to the inner end of shaft 70, and a gear 72 keyed to shaft 64 behind gear 63 and meshing with pinion 71.

Pinion 62 also meshes with a gear 73 keyed to a transversely extending stub shaft 74 disposed inwardly of shaft 61. The inward portion of gear 73 meshes with a pinion 75 mounted on suitable bearings on a cross slide feed shaft 76. A clutch 77 is mounted on shaft 76 and is actuated by mechanism connected to a cross feed lever 78 to connect pinion 75 to shaft 76 to thus drive shaft 76 from shaft 57. A gear 79 keyed to shaft 76 is connected through a suitable inwardly extending gear train 80 to a pinion 81 keyed to the forward end portion of a cross slide feed screw 82 which extends transversely in a groove or opening in the carriage and parallel to the cross slide ways. A cross slide nut 83 is threadably mounted on feed screw 82 within the opening and is bolted or otherwise secured to the respective cross slide. Rotation of feed screw 82, by means of the connections described above, will cause nut 83 and the cross slide to move transversely on the carriage.

Manual operation of feed screw 82 for cross slide movement is provided by a handwheel 84 which is mounted on the carriage apron. Handwheel 84 is directly connected to the front end of a shaft 85 and actuates shaft 76 through a pinion 86 keyed to the rearward portion of shaft 85, and a gear 87 which meshes with pinion 86 and is keyed to shaft 76 adjacent gear 79.

The auxiliary drive for longitudinal movement of each carriage and transverse movement of each cross slide is provided by the splined traverse drive shaft 45. A sleeve 88 is keyed to shaft 45 within each carriage apron and is provided with an outer clutch slider 89 and an inner clutch slider 90 keyed thereto.

A pair of spaced facing bevel gears 91 are loosely mounted on sleeve 88 on opposite sides of clutch slider 89. Bevel gears 91 mutually mesh with a horizontal bevel gear 92 mounted on the lower end of a vertically extending shaft 93. Shaft 93 extends upwardly within the carriage apron and has a worm 94 keyed adjacent the upper end thereof. Worm 94 meshes with a gear 95 keyed centrally on shaft 64 to provide a connection between drive shaft 45 and rack 68. Selective forward and reverse movement of the carriage is accomplished by selectively clutching sleeve 88 to one of the bevel gears 91. A hand lever 96 mounted on the front of the apron is connected through suitable linkages to clutch slider 89. Manual manipulation of the lever moves slider 89 to engage the desired bevel gear 91.

A second pair of spaced facing bevel gears 97 is loosely mounted on sleeve 88 on opposite sides of clutch slider 90. Bevel gears 97 mutually mesh with a horizontal bevel gear 98 mounted on the lower end of a vertically extending shaft 99. Shaft 99 extends upwardly within the carriage apron, similarly to shaft 93, and has a worm 100 keyed adjacent the upper end thereof. Worm 100 meshes with a gear 101 keyed to the rearward portion of shaft 76 to provide a connection between drive shaft 45 and feed screw 82. Selective forward and reverse transverse movement of the cross slide is accomplished by selectively clutching one of the bevel gears 97 to sleeve 88. A lever 102 mounted on the inward side of the carriage apron is connected through suitable linkages to clutch slider 90. Manual manipulation of the lever moves slider 90 to engage the desired bevel gear 97.

Machining of each side of a workpiece 25 (FIG. 1) is accomplished by mechanism including generally, a multiple template indexing apparatus 103, servo controlled tracer apparatus 104, and tool holding apparatus 105.

The multiple template indexing apparatus 103 (FIGS. 1, 2, 4 and 5) comprises a transversely extending template holder or multiface drum 106, similar to that disclosed in my copending United States application Serial No. 534,419 filed September 15, 1955. The drum 106 illustrated has four faces with each face having a tracer pattern or cam 107 secured in place thereon. Each tracer cam 107 may be different in configuration for the purpose of producing rough and finished cuts on the same workpiece.

Drum 106 is disposed adjacent the outer end portion of the respective carriage and has a trunnion at the rearward end which is journaled in suitable frictionless bearings disposed in an upstanding rear housing 108 mounted on the carriage. The forward end portion of drum 106 is secured to an annular index ring 109 which is mounted on suitable bearings 110 disposed in an upstanding front housing 111 mounted on the carriage.

Figures 4, 5, 6:
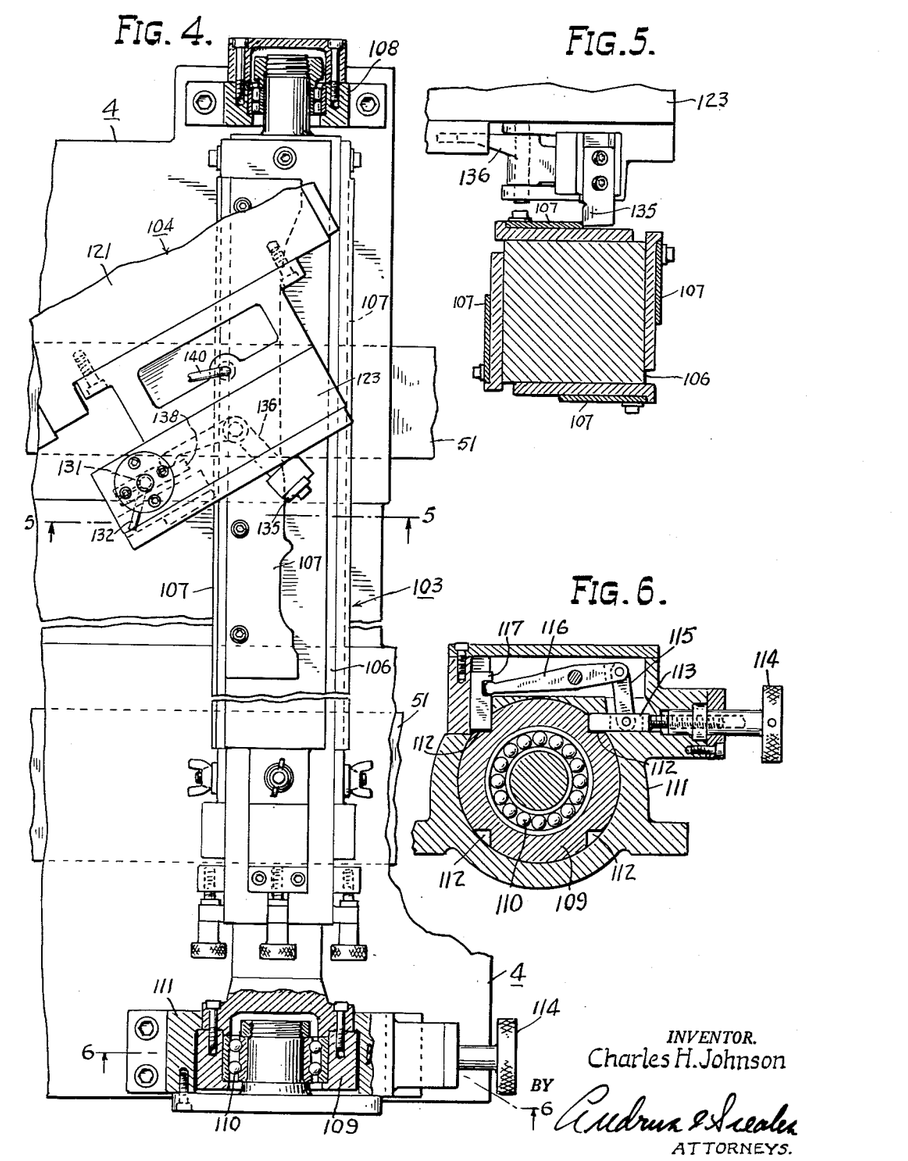
FIG. 4 is an enlarged top plan view of the right hand template holding drum, partly in section.
FIG. 5 is a transverse section of the drum taken on line 5—5 of FIG. 4.
FIG. 6 is a transverse section of the indexing and drum locking mechanism taken on line 6—6 of FIG. 4.

For purposes of selective placement of the various cams 107, a plurality of right angle indexing notches 112 are disposed in the annular surface of ring 109. As shown in FIG. 6, four notches are used when a four-faced drum is provided. At any of the four indexed positions of drum 106, an index pin 113 is adapted to engage one of the notches. Pin 113 extends outwardly of housing 111 and has a suitable knob 114 threadably secured thereto for manual manipulation thereof. The inner end portion of pin 113 is slotted to pivotally receive one end of a link 115. The other end of link 115 is pivotally mounted on one end of an arm 116 which is pivoted adjacent its center and adapted to be loosely received at the other end by a slidable index bolt 117. When pin 113 engages one notch 112, the linkage is such that bolt 117 engages one of the other notches. Pin 113 and bolt 117 extend at right angles to each other to provide accurate indexing of drum 106.

When it is desired to index drum 106 to a different position, knob 114 is manually rotated to screw pin 113 outwardly and move bolt 117 so that they are released from their respective notches. Drum 106 may then be rotated manually or by another suitable means, such as that disclosed in my above-identified copending application, until the desired position is reached, at which time knob 114 is rotated to return pin 113 to its inward position to lock the drum in place.

The servo controlled tracer apparatus 104 (FIGS. 7 and 8) comprises a tracer slide member 118 which is mounted for sliding movement on suitable ways 119 which are mounted for pivotal adjustment about a pivot button 120 secured to the cross slide. Ways 119 are shown as being at a substantial angle to the direction of movement of the carriage. A hydraulic cylinder 121 is secured to the outer end of slide member 118 parallel to its direction of movement, and a piston and rod member 122 is disposed therein and extends therefrom, and is secured to ways 119. Cylinder 121 is actuated by suitable means to provide a controlled sliding movement of tracer slide 118. The cylinder actuating means may be of a type similar to that disclosed in my above-identified application and my copending United States application Serial No. 348,302, filed April 13, 1953, now abandoned.

For this purpose, a jet housing 123 (FIGS. 9 and 10) is provided adjacent cylinder 121. Housing 123 has a jet block 124 secured to the outer end thereof with two adjacent jet ports 125 and 126, connected by suitable fluid lines 127 and 128 to ports in the opposite ends of cylinder 121.

A jet tube 129 is disposed within housing 123 and has a discharge jet nozzle 130 facing jet block 124. The inner end of jet tube 129 is mounted for horizontal pivoting on a vertical tubular pivot shaft 131 mounted in housing 123 and which is connected at the top by a conduit or line 132 to a pump 133 or similar source of fluid pressure which draws fluid from a suitable sump 134. Fluid under pressure is thus supplied from sump 134, through shaft 131 and tube 129 to nozzle 130.

The jet tube 129 is pivotally actuated to effect selective pressure changes in the ports 125 and 126 and the corresponding ends of cylinder 121, by the tracer cam 107. For this purpose, each tracer cam surface is disposed during operation to face in the same direction as the work surface of the workpiece 25 to be machined.

Figures 9, 10, 11:
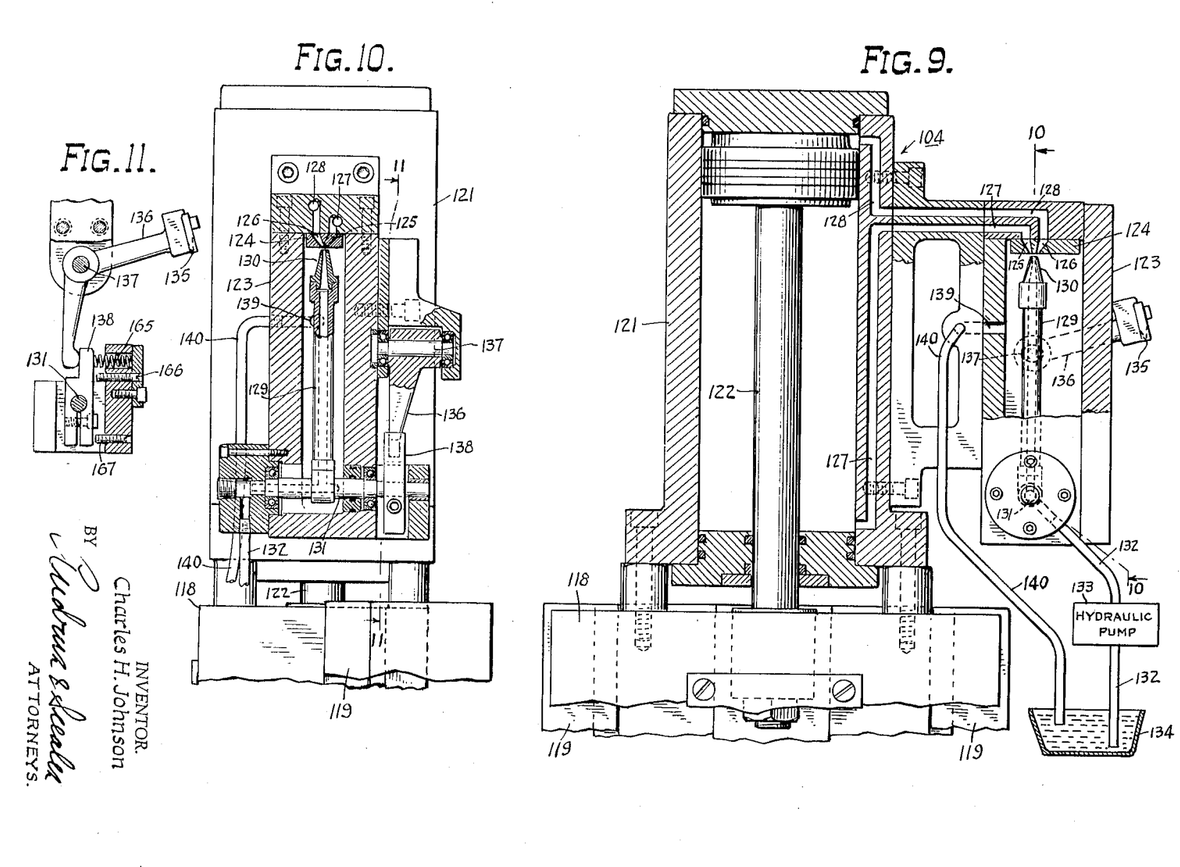
FIG. 9 is a horizontal section of the servo-mechanism showing the hydraulic system and with some parts in elevation.
FIG. 10 is a vertical section through the servo-mechanism taken on line 10—10 of FIG. 9.
FIG. 11 is a horizontal section through a portion of the servo-mechanism and taken on line 11—11 of FIG. 10.

A downwardly extending follower or tracer finger 135 is mounted on the outer end of a lever member 136 adjacent housing 123 (FIGS. 5, 10 and 11). Member 136 is of generally L-shaped configuration and is mounted at the intersection of the arms thereof to a vertically extending rotatable shaft 137. The inner end of lever 136 is adapted to engage a horizontally extending arm 138 which is secured to shaft 131.

As finger 135 follows the varying contour of a cam 107, lever 136 will pivot arm 138 and thus rotate shaft 131 to pivot jet tube 129 and thereby supply relatively different amounts of fluid pressure to ports 125 and 126 and hence to the opposite ends of cylinder 121 to move tracer slide 118 and its tool toward or away from the workpiece. As shown in FIG. 11, a suitable spring 165 horizontally mounted adjacent jet housing 123 biases lever 138 so that finger 135 will constantly follow the cam surface of the tracer cam. Adjustable set screw stops 166 and 167 are adapted to be engaged by lever 138 during pivoting of the latter to limit the range of movement of jet tube 129.

As tracer slide 118 moves on the cross slide, the position of slide 118 is changed in a manner which constantly tends to return jet tube 129 to a neutral position.

A drain port 139 is disposed in housing 123 and connects through a line 140 to sump 134 to provide drainage of fluid which may not pass into ports 125 and 126 from nozzle 130, depending upon the pivoted position of jet tube 129.

The tool holding apparatus 105 (FIGS. 1, 7 and 14) comprises an indexable turret member 141 suitably mounted for rotation on the inner end portion of the corresponding tracer slide 118. The turret member 141 shown has four faces with each face having apparatus for holding the desired machining tool 142. Turret 141 may be indexed manually or by any other suitable well-known means, not shown, to selectively present a tool to the workpiece, commensurate with the desired type of cut to be made and the particular template 107 used. A suitable indexing apparatus is disclosed in the present inventor's United States Patent No. 2,659,960, issued on November 4, 1953. A lever 143 disposed above turret 141 and connected thereto may be manually actuated to lock the turret in place.

To prevent vibration and distortion of workpiece 25 during machining, a steady-rest unit 144 (FIGS. 1, 12 and 13) is provided on each side of headstock unit 2. Each unit 144 comprises a downwardly and slightly inwardly extending arm 145 which is suspended from and mounted for longitudinal sliding movement on a track 146 which depends from the lower horizontal surface of overhead bridge 5. Arm 145 is substantially T-shaped in section with the legs of the T extending mutually perpendicularly and parallel to the major longitudinal and transverse axes of the machine. This arm configuration provides high rigidity longitudinally of and transverse to the axis of the workpiece and disperses vibratory forces to the bridge.

The upper end portion of arm 145 is provided with a nut 147 which is disposed within a channel in track 146 and threadably mounted on a shaft 148. Shaft 148 is rotatably mounted at its inner end in a suitable bearing member 149 secured to a portion of bridge 5, and adjacent its outer end in a bearing 150 secured to bridge 5 slightly inwardly of the vertical columns.

Shaft 148 is rotated by an electric motor 151 mounted on bridge 5 adjacent the end thereof. Motor 151 is connected through a suitable chain and sprocket drive 152 to shaft 148. Selective actuation of motor 151 may be provided by any suitable means, not shown, and controls movement of the corresponding steady-rest unit parallel to the axis of rotation of spindle 17.

Fine adjustment of unit 144 relative to shaft 148 is provided, as shown in FIG. 15, by a bevel gear 153 keyed to the inner end of shaft 148. Gear 153 meshes with a bevel gear 154 keyed to a horizontal forwardly extending rotatable shaft 155 which is mounted on bridge 5 and housing 16. Shaft 155 is connected through a suitable chain sprocket drive 156 to a horizontal rotatable shaft 157 disposed beneath shaft 155 and extending through the front wall of housing 16. A handwheel 158 is secured to the front end of shaft 157 and is adapted for manual turning to provide the fine adjustment.

After the desired placement of unit 144 has been made, unit 144 is locked to track 146 by a clamp 159 and clamp screw 160 connected therebetween (FIG. 13).

The lower end of arm 145 is provided with a suitable horizontal flange 161 to which a mounting member 162 is bolted or otherwise secured. A shaft 163 is vertically secured to member 162, and a horizontal roller 164 is mounted for rotation on bearings on the lower end of the shaft. Roller 164 is adapted to be disposed in engagement with the central portion of workpiece 25 directly above the opening thereof during the machining operation, and the pair of rollers are disposed to engage a rotating workpiece in identical locations and in rolling control relative thereto on opposite sides thereof to essentially grip the workpiece during rotation and stabilize it against any undesirable vibrations such as those produced by tool-workpiece resistance. Each roller 164 also serves as a backing to support the workpiece against any possible biasing force exerted by the opposite roller.

Since the thickness of a jet engine compressor disc increases substantially adjacent the center opening, gripping of the disc adjacent the center stabilizes the thinner portions thereof during machining.

A modification of the workpiece center holding means is shown in FIG. 16 of the drawings, and is used advantageously when the axial opening thereof is relatively small. The modification comprises a downwardly extending mounting member 168 secured to each flange 161 and having suitable bearings 169 disposed therein and adapted to be concentric with the spindle axis. A shaft 170 is horizontally mounted for rotation in bearings 169 and extends axially toward the workpiece. The end portion of shaft 170 is shown as enlarged to form a circular workpiece gripper 171 which is adapted to engage the thickened inner portion of the workpiece face and partially enter the center opening.

When both grippers 171 are in contact with the workpiece, each will support the workpiece against vibration and against any force exerted by the corresponding opposite gripper. In this instance, both grippers 171 will rotate with the workpiece and the contact therewith will be fixed, as compared with the rolling contact of rollers 164.

In machining a given workpiece, index drums 106 are positioned with preferably identical cams 107 in position for following. Fingers 135 are set on corresponding identical portions of the cam surface relative to the workpiece axis. The angles of tracer slides 118 are such as to be identical, and the desired tools 142 are positioned on turrets 141 so that the tool points are disposed identical distances from the ends of the followers 135. Cross slides 52 and 53 are positioned by turning cross feed shafts 76 until the coresponding opposite tools are equidistant from the workpiece axis. Carriages 3 and 4 are then moved toward workpiece 25, simultaneously if desired, until the tool points engage the workpiece. The tool points should be in identical point-to-point relationship, except for the workpiece which separates them. Arms 145 are then brought into position so that rollers 164 or grippers 171 contact the respective sides of the workpiece.

Rotation of spindle 17 is commenced by the drive from motor 6, and cross feed shafts 76 are clutched to feed rod 37, the latter also being driven from motor 6 to synchronize transverse tool feed with workpiece rotation. Any change in spindle speed will be accompanied by a corresponding change in feed rate for both tools, since both tools and the spindle are synchronized with motor 6. Both tools will feed across the workpiece at identical rates and will remain in facing relationship, thereby supporting the workpiece against deformation due to longitudinal tool pressure. The tools will be moved longitudinally to provide the desired workpiece face contours by the servo mechanisms actuated by followers 135 and cams 107.

The tools are preferably fed across the workpiece from front to rear, beginning at the outer edge thereof. When the center axis of the workpiece is crossed by the tools, motor 6 is reversed to reverse the direction of rotation of spindle 17. The direction of tool feed will remain the same, however, due to the mechanism including clutches 43 and 44.

After an initial machining cycle is completed in which a rough or other suitable initial cut is made, the carriages 3 and 4 are retracted or the tracer slides are withdrawn. The cross slides 52 and 53 are retracted to starting position, each tool post or turret 141 is indexed to position the next successive working tools for presentation to the workpiece, and drums 106 are indexed to position the next successive tracer patterns for operative control of the corresponding tracer slides 118. The cutting cycle, as described above, is then repeated and the entire procedure is repeated until enough cutting passes have been made to complete the workpiece.

The center drive machine tool of the invention is flexible in operation, as well as being highly accurate. Contour control means for providing several selective contour passes of associated working tools is provided. The combination of pairs of multiple indexing tracer pattern drums, servo mechanisms for tool control, simultaneous point-to-point tool positioning, and steady rests for counteracting vibrations set up by workpiece rotation and tool-workpiece friction, produces a mechanism capable of machining workpieces down to very thin wall thickness and with an extremely high accuracy.

Various modes of carrying out the invention are contemplated as being within the scope of the following claims particularly pointing out and distinctly claiming the subject matter which is regarded as the invention.

I claim:

1. In a machine tool having a ring-like spindle mounted for rotation about a spindle axis and having a chuck member for supporting the periphery of a thin disc for rotation of the disc about said axis, freely rotatable means engageable with the central portion of each opposite face of the disc and disposed in opposed relation to cooperate with the said chuck to steady the disc and prevent undesirable vibration thereof in a direction parallel to the extent of said spindle axis during rotation of the disc, and means to move said freely rotatable means parallel to said spindle axis and into engagement with each face of the said disc.

2. In a machine tool having a centrally mounted ring-like spindle mounted for rotation about a spindle axis and having a chuck member for supporting the periphery of a thin disc for rotation of the disc about said axis, a frame extending parallel to said axis and disposed above the same, an arm extending downwardly from said frame on each side of said spindle, track means connecting each said arm with said frame for permitting movement of each arm in a direction parallel to said spindle axis, a rotatable member carried by the lower end portion of each said arm and with each said rotatable member being disposed for engagement with one face of the disc closely adjacent said spindle axis to prevent vibration of the disc in a direction parallel to the extent of said axis during rotation of the disc, and means on said frame for moving each said arm on said track means and parallel to said axis to bring each said rotatable member into opposed contact with said disc to steady the latter.

3. In a machine tool having a rotatable spindle with a chuck to grip a disc, means for driving said chuck about the axis of said spindle, a support on each side of said spindle and with each said support being translatable in a direction transverse to said spindle axis, each said support being adapted to carry a tool for engagement with the disc, manually operative means for moving each said support in said transverse direction for initially disposing the points of the tools on a common axis extending parallel to said spindle axis, and motively driven feed means for moving each said support simultaneously and synchronously with the other support and synchronously with the said chuck driving means and in said transverse direction to provide substantially identical rates of unidirectional transverse tool movement; said feed means comprising a transmission connected between said chuck driving means and each said support, said transmission including, a first shaft driven from said chuck driving means and having a gear thereon, a second shaft, a gear on said second shaft meshing with the gear on said first shaft for driving said second shaft from said first shaft, a third shaft connected to each said support, a gear mounted for relative rotation about said third shaft and meshing with the gear on said second shaft, a first overriding unidirectional clutch on said third shaft and disposed to be responsive to the direction of rotation of the gear on said third shaft so that said first clutch will drive said third shaft to move each said support in a transverse feed direction only when said first shaft is driven in one direction, a first sprocket on said second shaft and rotatable therewith, a second sprocket mounted for relative rotation about said third shaft, means connecting the sprockets to drive said second sprocket from said first sprocket, and a second overriding unidirectional clutch on said third shaft and disposed to be responsive to the direction of rotation of said second sprocket so that said second clutch will drive said third shaft to move each said support in said transverse feed direction only when said first shaft is driven in a direction opposite from said one direction.

4. In a machine tool for machining opposed faces of a thin flexible disc, an annular chuck for gripping and supporting the periphery of a disc, means for driving said chuck in forward and reverse directions about the axis of rotation of the disc, steady rest means for engaging and supporting the disc directly above and closely adjacent said axis, a pair of tools disposed in a horizontal plane below said steady rest means and closely adjacent said axis for simultaneously machining the opposite faces of the disc and with said tools adapted to confine the disc therebetween; means for moving said tools in said plane and transversely of said axis from a first point adjacent said chuck to a second point adjacent said chuck but generally diametrically opposite from said first point, so that said tools are maintained between said chuck and said steady rest means with the disc confined between said tools during movement thereof so that the disc will be cooperatively supported against vibration in a direction parallel to the extent of said axis by said chuck, said steady rest means and said tools; and means for reversing the direction of rotation of said chuck when the tools are moved to adjacent the said axis by said tool moving means.

References Cited in the file of this patent

UNITED STATES PATENTS

| | | |
|---|---|---|
| 727,413 | McCraken | May 5, 1903 |
| 1,179,362 | Sparks | Apr. 11, 1916 |
| 1,587,261 | White | June 1, 1926 |
| 1,649,124 | Olin | Nov. 15, 1927 |
| 1,976,072 | Howard | Oct. 9, 1934 |
| 2,069,426 | Smith | Feb. 2, 1937 |
| 2,080,207 | Hoppe | May 11, 1937 |
| 2,149,014 | Fritzsch | Feb. 28, 1939 |
| 2,192,436 | Groene | Mar. 5, 1940 |
| 2,311,211 | Class | Feb. 16, 1943 |
| 2,390,888 | Liber | Dec. 11, 1945 |
| 2,422,682 | Johnson | June 24, 1947 |
| 2,505,841 | Shuker | May 2, 1950 |
| 2,526,487 | Kurzweil | Oct. 17, 1950 |
| 2,558,275 | Siekmann | June 26, 1951 |
| 2,588,651 | Nelson | Mar. 11, 1952 |
| 2,642,650 | Clark | June 23, 1953 |
| 2,697,373 | Siekmann | Dec. 21, 1954 |
| 2,720,129 | De Haas | Oct. 11, 1955 |
| 2,749,779 | Godat | June 12, 1956 |
| 2,777,201 | Wetzel | Jan. 15, 1957 |
| 2,777,349 | Johnson | Jan. 15, 1957 |
| 2,782,568 | Cafolla | Feb. 26, 1957 |
| 2,791,928 | Saddoris | May 14, 1957 |
| 2,813,445 | Twamley | Nov. 19, 1957 |
| 2,887,639 | Dutcher | May 19, 1959 |

FOREIGN PATENTS

| | | |
|---|---|---|
| 25,671 | Australia | Mar. 19, 1931 |
| 1,041,801 | France | June 3, 1953 |
| 1,132,553 | France | Nov. 5, 1956 |
| 930,358 | Germany | July 14, 1955 |
| 932,215 | Germany | Aug. 25, 1955 |
| 300,880 | Great Britain | Nov. 22, 1928 |
| 384,986 | Great Britain | Mar. 14, 1930 |